Jan. 14, 1964   E. F. SAEWERT   3,117,803
FIFTH WHEEL CONSTRUCTION
Filed March 19, 1962   3 Sheets-Sheet 1

Eugene F. Saewert
INVENTOR.

BY *Clarence A. O'Brien*
and *Harvey B. Jackson*
Attorneys

Jan. 14, 1964 E. F. SAEWERT 3,117,803
FIFTH WHEEL CONSTRUCTION
Filed March 19, 1962 3 Sheets-Sheet 2

Eugene F. Saewert
INVENTOR.

Jan. 14, 1964　　　E. F. SAEWERT　　　3,117,803
FIFTH WHEEL CONSTRUCTION
Filed March 19, 1962　　　　　　　　　　　3 Sheets-Sheet 3
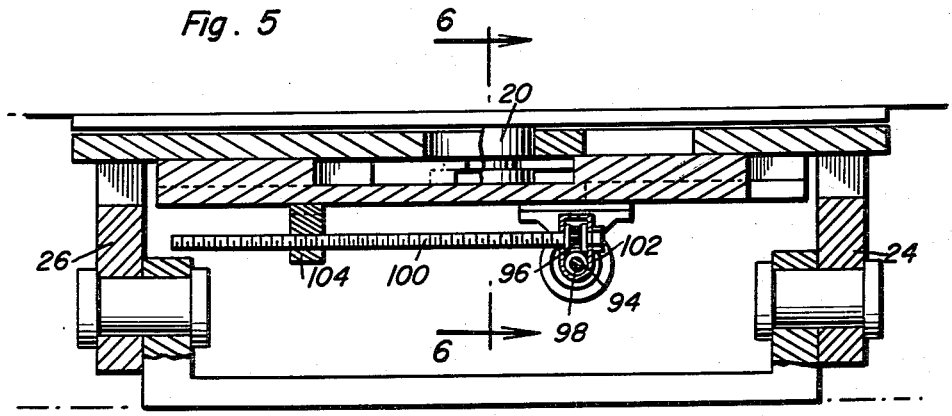
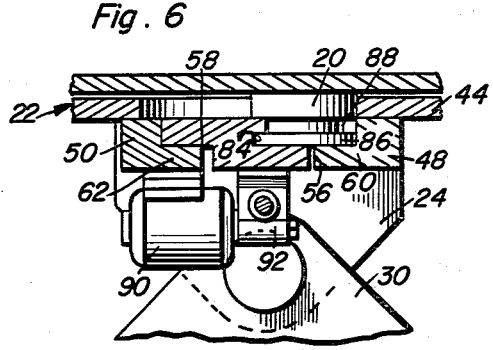
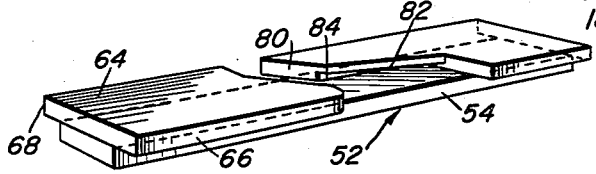
Eugene F. Saewert
INVENTOR.

3,117,803
FIFTH WHEEL CONSTRUCTION
Eugene F. Saewert, 3625A S. Whitnall Ave., Milwaukee, Wis.
Filed Mar. 19, 1962, Ser. No. 180,485
12 Claims. (Cl. 280—433)

This invention relates to a novel and useful fifth wheel assembly primarily designed for use on tractor-type vehicles in lieu of the conventional fifth wheel connector plate assembly. It is to be understood that the fifth wheel assembly of the instant invention is constructed in a manner whereby it may readily function as a replacement for existing fifth wheel connector plates or as a portion of original equipment provided with tractor-type vehicles.

The conventional type of fifth wheel connector plate presently in wide-spread use includes a bearing plate-like structure which is pivotally secured to the frame of a tractor-type vehicle for movement about a horizontally disposed axis extending transversely of the vehicle and the conventional connector plate is provided with a rearwardly opening slot defining a pair of arms on either side thereof. The fifth wheel pin carried by the trailer vehicle is adapted to be received through this rearwardly opening slot formed in the conventional connector plate and to be seated in the forward end portion of the slot which normally defines a rearwardly opening semi-circular seat. The conventional type of connector plate may be provided with various types of latching or locking members which are movably mounted on the connector plate for movement between a retracted position disposed on one side of the slot formed in the connector plate to an extended position extending across the slot slightly rearwardly of its forward end and immediately to the rear of a fifth wheel pin seated in the forward end of the slot. The latching or locking member is then locked in position and in this manner the fifth wheel pin of the trailer vehicle is prevented from moving rearwardly through the slot formed in the connector plate. Accordingly, it may be seen that substantially all of the forward thrust effected by the conventional type of fifth wheel connector plate assembly is applied to the trailer vehicle fifth wheel pin by means of the latching or locking member. As this locking or latching member must necessarily be movably mounted on the connector plate, it is inherently weak and thus must be over heavily constructed in order to stand the loads which will be placed thereon.

The fifth wheel assembly of the instant invention utilizes a connector plate which is similar to those of conventional fifth wheel assemblies but which is provided with a button hook type of slot including a long leg portion which opens rearwardly through the rear end of the connector plate and terminates at its forward end in a back-turned hook portion whose end remote from the long leg portion terminates in a forwardly facing seat adapted to have a fifth wheel pin seated therein. In this manner, once the fifth wheel pin of the semi-trailer vehicle has been seated in the forwardly facing seat defined by the connector plate itself, a forward thrust of the connector plate on the fifth wheel pin is applied directly from the connector plate and not to a latching or locking member provided for retaining the fifth wheel pin of the trailer in seated engagement in the seat formed in the end of the back-turned portion remote from the long leg portion of the slot. By constructing the fifth wheel assembly connector plate in such a manner in order that the forward thrust of the connector plate by the tractor vehicle will be transferred to the fifth wheel pin of the semi-trailer directly from the connector plate, substantially all of the pulling thrust effected by the connector plate is prevented from being applied to the fifth wheel pin of the semi-trailer vehicle by means of any portion of the latching or locking means utilized to retain the semi-trailer fifth wheel pin in seated engagement in the seat formed in the connector plate.

The main object of this invention is accordingly to provide a fifth wheel assembly including a connector plate which is provided with a forwardly facing seat adapted to seatingly receive the fifth wheel pin of a semi-trailer vehicle.

A further object of this invention, in accordance with the immediately preceding object, is to provide a connector plate having a button hook type of slot rather than the conventional straight and longitudinally extending slot in order that the end of the curved portion of the button hook slot may open forwardly and be adapted to seatingly receive the fifth wheel pin of a semi-trailer vehicle while the free end of the long leg portion of the button hook slot may open rearwardly of the connector plate in the conventional manner for the reception of the semi-trailer fifth wheel pin from the rear of the connector plate.

Still another object of this invention is to provide a connector plate in accordance with the preceding objects including cam means having a portion adapted to engage a fifth wheel pin disposed in the end portion of the hooked portion of the slot adjacent the long leg portion and to move the fifth wheel pin through the hooked portion toward the free end thereof which defines the forwardly opening seat.

A further object of this invention is to provide the cam means with a portion adapted to engage a fifth wheel pin seated in the forwardly opening free end of the hooked portion defining the seat and move the pin through the hooked portion into a position in the end thereof immediately adjacent and in alignment with the forward end of the rearwardly opening long leg portion of the slot.

A still further object of this invention is to provide the cam means with a portion movably mounted relative to the connector plate and adapted to cam a fifth wheel pin disposed in the back-turned hook portion of the slot adjacent the free end of the hooked portion of the slot into seated engagement with that free end portion which defines the forwardly opening seat for receiving the semi-trailer fifth wheel pin.

A still further object of this invention is to provide the cam means with motor means including actuating means therefor adapted to be operated from a remote position such as the cab of the tractor vehicle.

Another object of this invention is to provide the actuating means with automatic limit stop motor cut-off means operable in response to movement of the cam means to a position normally camming a fifth wheel pin into seated engagement with the seat formed by the free end portion of the back-turned hook portion of the slot.

Yet another object of this invention is to provide the actuating means with automatic limit stop motor cut-off means operable in response to movement of the cam means to normally cam a fifth wheel pin out of seated engagement in such seat and through said back-turned portion into a position therein aligned with the adjacent end of the long leg portion of the slot.

Another object, in accordance with the preceding object, is to provide a limit stop motor cut-off means which is adjustable whereby wear between the fifth wheel pin and the cam means may be compensated for.

A final object to be specifically enumerated herein is to provide a fifth wheel assembly in accordance with the preceding objects which will conform to the conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is an enlarged fragmentary transverse vertical sectional view taken substantially upon the plane indicated by the section line 5—5 of FIGURE 2;

FIGURE 6 is a fragmentary longitudinal vertical sectional view taken substantially upon the plane indicated by section line 6—6 of FIGURE 5;

FIGURE 7 is a perspective view of the cam slide of the connector plate; and

FIGURE 8 is a diagrammatic view of the wiring circuit for the reversible motor means of the cam plate.

Figure 1:
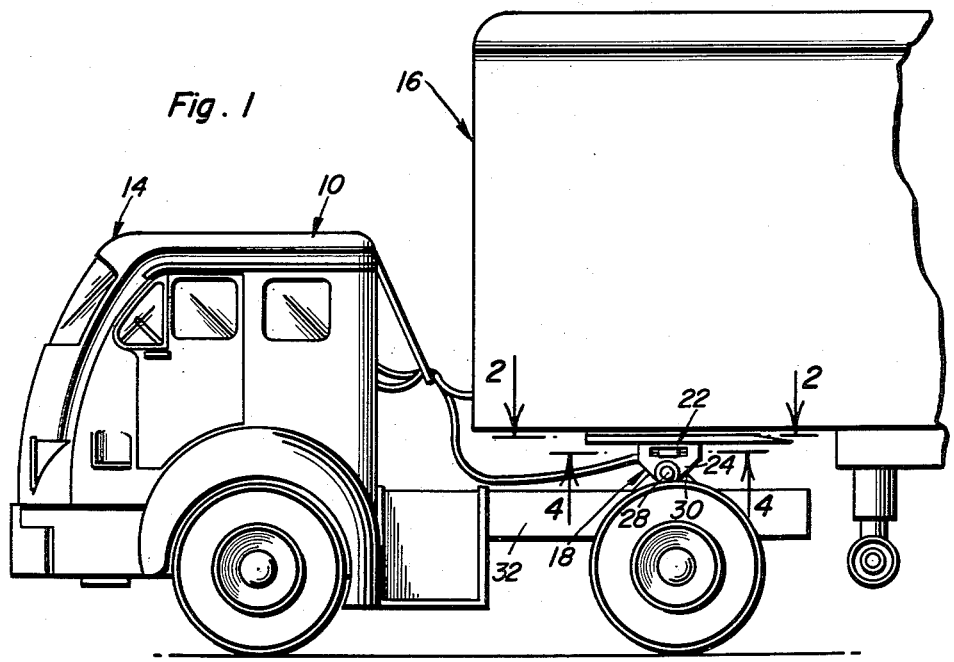
FIGURE 1 is a fragmentary side-elevational view of a conventional type of tractor trailer combination vehicle into which the fifth wheel assembly of the instant invention has been incorporated.

Referring now more specifically to the drawings, the numeral 10 generally designates a tractor-trailer vehicle including a tractor 14 and a trailer 16. The tractor is provided with a fifth wheel assembly constructed in accordance with the present invention and generally designated by the reference numeral 18 and the trailer includes a depending fifth wheel pin 20, see FIGURES 2–6, which, when the trailer 16 is operatively connected to the tractor 14, is rotatably journaled by means of the fifth wheel assembly 18 for rotation about an upstanding axis.

Figure 4:
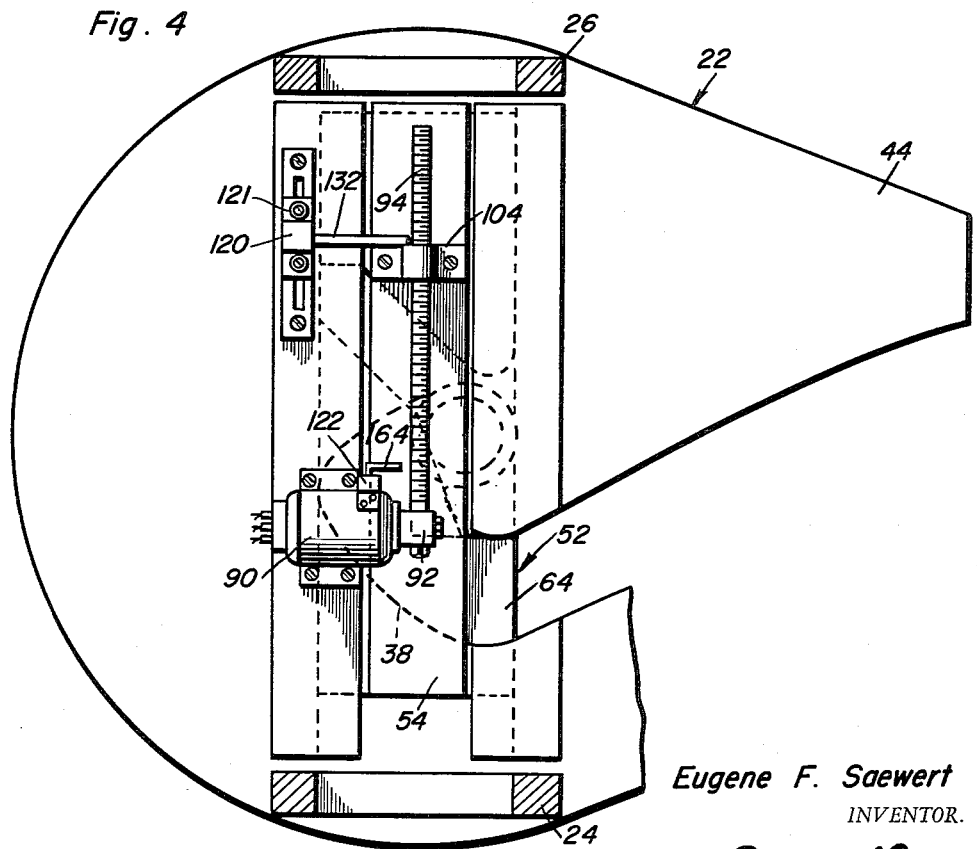
FIGURE 4 is an enlarged bottom plan view of the fifth wheel assembly with parts thereof being broken away.

With attention now directed more specifically to FIGURES 4 through 6 of the drawings it will be seen that the fifth wheel assembly 18 comprises a connector plate generally referred to a reference numeral 22. The connector plate 22 has a plurality of transversely spaced and aligned journal portions 24 and 26 secured thereto in any convenient manner and a pivot pin 28 is passed through the journal portions 24 and 26 and also through a pair of journal portions 30 which are transversely spaced and aligned supported from the main frame 32 of the tractor 14.

The connector plate 22 is provided with a button hook slot 34 including a long leg portion 36 which extends generally longitudinally of the connector plate 22 and opens rearwardly through the rear end of the connector plate. The forward end of the long leg portion 36 terminates in a back-turned portion 38 terminating at its free end in a forwardly facing seat 40 in front to rear alignment with the rear end of the long leg portion 36. The rear portions of the upper surfaces of the arms 42 and 44 defined by the slot 34 are rearwardly and downwardly inclined as at 46 and define ramps for engagement by the fifth wheel pin assembly carried by the undersurface of the forward end of the trailer 16.

The connector plate 22 has a pair of generally L-shaped guides 48 and 50 formed either integrally therewith or separately and secured thereto in any convenient manner and it will be noted that the guides 48 and 50 extend transversely of the connector plate 22 and are spaced longitudinally thereof. The guides 48 and 50 define ways which are substantially parallel and slidingly support a cam slide generally referred to by the reference numeral 52. The cam slide 52 includes a lower elongated portion 54 having generally parallel opposite side edges and the lower portion 54 is snugly received between the confronting side edges 56 and 58 of the horizontal legs 60 and 62 of the guides 48 and 50, respectively. The cam plate 52 also includes an upper portion 64 which includes generally parallel opposite side longitudinal edges 66 and 68 and it will be noted that the upper portion 64 is wider than the lower portion 54 and has its opposite side marginal edge portions projecting outwardly beyond the opposite side edges of the lower portion 54. The opposite side marginal edge portions of the upper portions 64 are disposed in sliding contacting relation with the upper surfaces of the horizontal legs 60 and 62. In this manner, the cam plate or slide 52 is slidingly supported from the connector plate 22 for movement transversely thereof.

Figure 3:
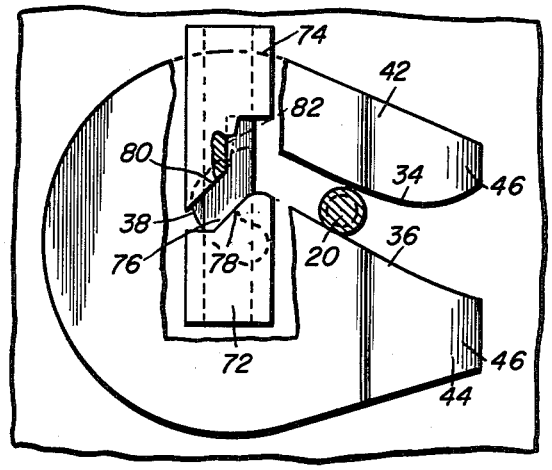
FIGURE 3 is an enlarged horizontal sectional view similar to that of FIGURE 2 but showing the component parts of the fifth wheel assembly in different positions.

With attention now invited to FIGURE 3 of the drawings it will be noted that the upper portion 64 includes a pair of opposite end sections 72 and 74. A fifth wheel pin receiving and camming slot 76 is defined between the opposite end sections 72 and 74 and includes first, second, and third camming surfaces 78, 80 and 82.

It may be seen from FIGURES 3 and 7 of the drawings that the camming surface 82 is spaced slightly above the upper surface of the lower portion 54 and is defined by an undercut portion 84. As can best be seen from FIGURE 6 of the drawings the undercut portion 84 is adapted to receive the extreme lower end portion of the fifth wheel pin 20. The lower terminal end portion 86 of the fifth wheel pin 20 is defined by a circumferential groove 88 formed in the fifth wheel pin 20 and the fifth wheel pin is locked in engagement with the connector plate 22 against axial movement.

A reversable electric motor 90 is secured to the under surface of the guide 50 in any convenient manner and includes a transmission 92 having a worm gear 94 which is meshed with a pinion gear 96 and carried by the output shaft 98 of the motor 90. The pinion gear 96 is secured to a screw shaft 100 which has one end journaled in the transmission housing 102 and the other end threadedly engaged with a block 104 carried by the cam slide 52. In this manner, it will be noted that the motor 90 may be utilized to reciprocate the cam slide 52.

With attention now directed to FIGURE 8 of the drawings it will be seen that the motor 90 is electrical and is provided with a ground lead 106 and forward and reverse leads 108 and 110. The block 104 is provided with two pairs of abutments 112, 114, 116, and 118 and a pair of adjustable limit switch assemblies 120 and 122 are provided for actuation by the abutments 112 and 116, respectively, FIGURE 4 showing a typical fastener and slot connection 121 between the assembly 120 and the guide 50. Additionally, a pair of on-off switches 124 and 126 are provided for actuation by the abutments 114 and 118, respectively. The limit switch 120 includes a terminal 128 and a terminal 130 which may be bridged by a movable bridging arm 132 that is normally resiliently urged to an operative position bridging the terminals 128, 130 by means of an expansion spring 134. A double pole double throw switch 136 is provided and includes a movable bar 140 for selectively bridging the terminals 144 and 142 and 146 and 148. The terminals 142 and 146 are operatively connected to one side of an on-off switch 150 by means of leads 152 and 154, respectively, and the other terminal of the on-off switch 150 is connected to a suitable source of electrical potential 156 such as the battery of the tractor 14 by means of lead 158. The limit switch 122 includes a pair of terminals 160 and 162 which may be bridged by means of a bridging arm 164 that is normally resiliently urged into a position bridging the contacts 160 and 162 by means of expansion spring 166. The on-off switch 126 includes terminals 170 and 172 which may be bridged by means of a bridging arm 174.

The bridging arm 174 is normally resiliently urged toward a position not bridging the contacts 170 and 172 by means of an expansion spring 176. Similarly, the on-off switch 124 includes terminals 178 and 180 which may be bridged by bridging arm 182. The bridging arm 182 is normally resiliently urged toward a position not bridging the contacts 178 and 180 by means of spring 184. A lead 186 electrically connects the terminals 144 and 130 and a lead 188 electrically connects in the terminal 178 to the terminal 189 on the ignition switch 191. Additionally, it may be seen that one end of a lead 190 is connected to the terminal 180 and that electrically actuated visual signal means 192 is connected in series in the lead 190 and that the other end of lead 190 is grounded.

It may further be seen that a lead 194 electrically connects the terminals 148 and 162 and that the terminal 170 is also electrically connected to the terminal 189 by means of a lead 195. In addition, a lead 196 has one end connected to the terminal 172 and an electrically actuated visual signal means 198 is connected in series in the lead 196 while the other end thereof is also grounded. The ignition switch 191 has its terminal 195 electrically connected to the battery 156 by lead 197.

In operation, the electric motor 90 may be run in a forward direction upon bridging of the contacts 146 and 148 in order to move the block 104 from the position illustrated in FIGURE 8 toward the motor 90. As the block 104 reaches its closest position to the motor 90 after shifting the cam slide to the right when viewing the connector plate 22 from the rear and thereby camming the pin 20 out of the seat 40, the abutment 116 will engage the bridging 164 and open the circuit between the contacts 160 and 162 shutting off the motor 90. At the same time, the abutment 118 will engage the bridging arm 174 and close the circuit between the contacts 170 and 172 actuating the signal means 198 to indicate that the cam slide 52 has reached the corresponding limit position. Then, upon bridging of the contacts 142 and 144 to effect reverse operation of the motor, the motor 90 will be actuated to move the block 104 away from the motor 90 as the bridging arm 120 will have been returned to its normal position bridging the contacts 128, 130. Additionally, at the time the block 104 moved to its limit position close to the motor 90, the abutment 114 moved out of engagement with the bridging arm 182 thus opening the circuit between the terminals 178 and 180 to terminate operation of the signal means 192. However, as the motor is operated in reverse and the block 104 moves away from the motor 90, the abutment 116 will move out of engagement with the bridging arm 164 allowing it again to bridge the contacts 160 and 162 and the abutment 118 will move out of contact with the bridging arm 174 thereby enabling the spring 176 to return it to its normal position opening the circuit between the contacts 170 and 172 to terminate operation of the signal means 198. Upon movement of the block 104 to the position illustrated in FIGURE 8 of the drawings, the abutment 114 will engage the bridging arm 182 to close the circuit between the terminals 178 and 180 and the abutment 112 will engage the bridging arm 132 to open the circuit between the terminals 128 and 130, again ceasing operation of the motor 90.

In operation, the motor 90 is initially actuated to move the cam slide 52 toward the motor 90 to the open position illustrated in FIGURE 3 of the drawings. Then, the tractor 14 may be backed toward the trailer 16 and the fifth wheel pin 20 may be guided into the rear end of the slot 36. As soon as the fifth wheel pin 20 has been positioned in the end of the back turned portion 38 of the slot 34, the tractor 14 may be stopped and the electric motor may be actuated to slide the cam slide 52 to the left as viewed from the rear of the connector plate 22 from the position illustrated in FIGURE 3 of the drawings to the position illustrated in FIGURE 2 of the drawings. During this operation, the second cam surface 80 will cam the fifth wheel pin 20 from the forwardmost part of the back turned portion 38 into the free end portion of the back turned portion 38 of the slot 34 adjacent seat 40 and thereafter the cam surface 82 will engage the groove 88 and urge the fifth wheel pin 20 into final engagement with the seat 40 defined by the free end of the back turned portion 38 of the slot 34. It will be noted that the cam surface 82 is inclined relative to the direction of movement of the cam slide 52 in order that the more the cam slide 52 is moved to the left as viewed from the rear of the connector plate the fifth wheel pin 20 will be urged into tighter seated engagement with the seat 40. When it is desired to release the fifth wheel pin 20 from engagement with the connector plate 22, the motor 90 is operated to effect sliding movement of the cam slide 52 to the right as viewed from the rear of the connector plate 22 whereupon the first cam surface 78 will cam the fifth wheel pin 20 out of the extreme free end portion of the back turned portion 38 of the slot 34, through the intermediate portion of the back turned portion 38 and into the end portion of the back turned portion of the slot 34 adjacent and in alignment with the forward end of the long leg portion 36 of the slot 34. Then, the tractor 14 may be pulled forward after setting the brakes of the trailer 16 in order to disengage the tractor 14 from the trailer 16.

Figure 2:
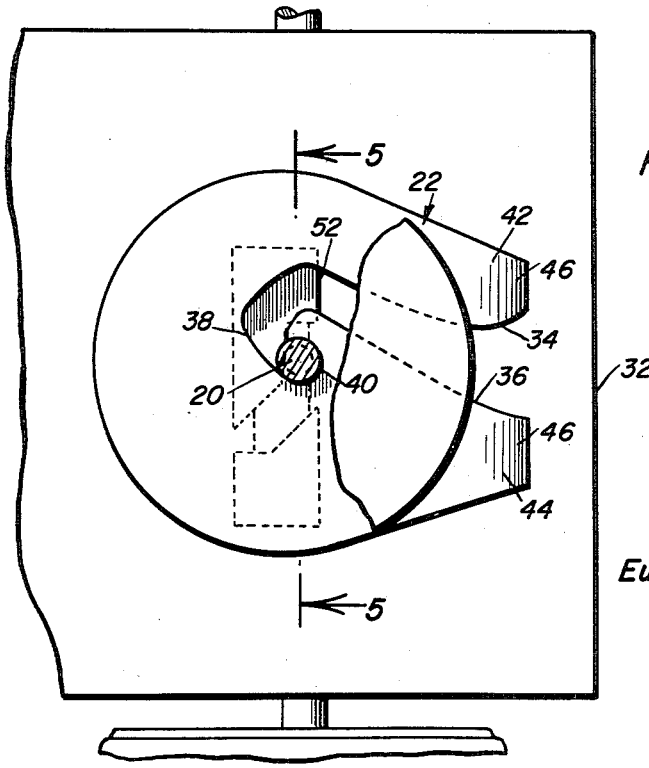
FIGURE 2 is an enlarged fragmentary horizontal sectional view taken substantially upon the plane indicated by section line 2—2 of FIGURE 1.

With attention now invited to FIGURE 2 of the drawings it will be noted that when the fifth wheel pin 20 is seated in engagement with the seat 40 that the forward thrust of the tractor 14 on the fifth wheel pin 20 will be directed upon the fifth wheel pin 20 directly by the connector plate 22. If it is desired, the seat 40 may be defined by a replaceable insert in order that whatever wear of the seat does occur may be compensated for by replacing such an insert. In addition, the cam slide 52 may be readily replaced whenever it is deemed necessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fifth wheel assembly comprising a fifth wheel connector plate, said connector plate having a button hook slot formed therein including a long leg portion terminating at one end in a back turned hook portion, the end of said long leg portion opening rearwardly through said plate defining a pair of arms on either side thereof, the end of said hook portion remote from said long leg portion terminating in a forwardly facing seat adapted to have a fifth wheel pin seated therein, and cam means movably mounted on said connector plate including a portion adapted to cam a fifth wheel pin disposed in said back turned hook portion adjacent said seat into seated engagement with said seat.

2. A fifth wheel assembly comprising a fifth wheel connector plate, said connector plate having a button hook slot formed therein including a long leg portion terminating at one end in a back turned hook portion, the end of said long leg portion opening rearwardly through said plate defining a pair of arms on either side thereof, the end of said hook portion remote from said long leg portion terminating in a forwardly facing seat adapted to have a fifth wheel pin seated therein, and cam means movably mounted on said connector plate including a portion adapted to cam a fifth wheel pin disposed in said back turned hook portion adjacent said seat into seated engagement with said seat, said cam means also including a portion adapted to engage a fifth wheel pin disposed in the end portion of said back turned hook portion adjacent said long leg portion and to move said fifth wheel pin through said back turned portion toward said seat.

3. A fifth wheel assembly comprising a fifth wheel connector plate, said connector plate having a button hook slot formed therein including a long leg portion terminating at one end in a back turned hook portion, the end of said long leg portion opening rearwardly through said plate defining a pair of arms on either side thereof, the end of said hook portion remote from said long leg portion terminating in a forwardly facing seat adapted to have a fifth wheel pin seated therein, and cam means movably mounted on said connector plate including a portion adapted to cam a fifth wheel pin disposed in said back turned hook portion adjacent said seat into seated engagement with said seat, said cam means also including a portion adapted to engage a fifth wheel pin seated in said seat and to move said fifth wheel pin from engagement with said seat and through said back turned portion into a position in the end of said back turned portion immediately adjacent and in alignment with the inner forward end of said long leg portion.

4. A fifth wheel assembly comprising a fifth wheel connector plate, said connector plate having a button hook slot formed therein including a long leg portion terminating at one end in a back turned hook portion, the end of said long leg portion opening rearwardly through said plate defining a pair of arms on either side thereof, the end of said hook portion remote from said long leg portion terminating in a forwardly facing seat adapted to have a fifth wheel pin seated therein, and cam means movably mounted on said connector plate including a portion adapted to cam a fifth wheel pin disposed in said back turned hook portion adjacent said seat into seated engagement with said seat, said cam means also including a portion adapted to engage a fifth wheel pin seated in said seat and to move said fifth wheel pin from engagement with said seat and through said back turned portion into a position in the end of said back turned portion immediately adjacent and in alignment with the inner forward end of said long leg portion, said cam means also including a portion adapted to engage a fifth wheel pin disposed in the end portion of said back turned hook portion adjacent said long leg portion and to move said fifth wheel pin through said back turned portion toward said seat.

5. The combination of claim 1 wherein the upper surfaces of the rear ends of said arms are rearwardly and downwardly inclined.

6. The combination of claim 1 including motor means drivingly connected with said cam means including actuating means therefor adapted to be operated from a remote position.

7. The combination of claim 6 wherein said actuating means includes automatic limit stop motor cut-off means operable in response to movement of said cam means to a position normally camming a fifth wheel pin into seated engagement with said seat.

8. The combination of claim 7 wherein said limit stop cut-off means includes means for adjustably positioning the point of movement of said cam means in one direction at which said limit stop cutoff means will cause the operation of said motor means to effect movement of the cam means in said one direction to be terminated.

9. The combination of claim 1 wherein said cam means also includes a portion adapted to engage a fifth wheel pin seated in said seat and to move said fifth wheel pin from engagement with said seat and through said back turned portion into a position in the end of said back turned portion immediately adjacent and in alignment with the inner forward end of said long leg position, motor means drivingly connected with said cam means including actuating means therefor adapted to be operated from a remote position, said actuating means including automatic limit stop motor cut-off means operable in response to movement of said cam means to normally cam a fifth wheel pin out of seated engagement with said seat and into said position in said back turned portion and aligned with the adjacent end of said long leg portion.

10. The combination of claim 9 wherein said actuatnig means includes automatic limit stop motor cut-off means operable in response to movement of said cam means to a position normally camming a fifth wheel pin into seated engagement with said seat.

11. The combination of claim 1 wherein said long leg portion is forwardly inclined away from the front to rear longitudinal center axis of said connector plate and the rear end of said long leg portion lies substantially upon said center axis which also passes through the center of said seat.

12. A fifth wheel assembly comprising a fifth wheel connector plate, said connector plate having a button hook slot formed therein including a long leg portion terminating at one end in a back turned hook portion, the end of said long leg portion opening rearwardly through said plate defining a pair of arms on either side thereof, the end of said hook portion remote from said long leg portion terminating in a forwardly facing seat adapted to have a fifth wheel pin seated therein, and retaining means movably mounted on said connector plate adapted for engagement with said fifth wheel pin to prevent forward movement of the latter out of engagement with said seat.

References Cited in the file of this patent
UNITED STATES PATENTS

| | | |
|---|---|---|
| 911,456 | Stenger | Feb. 2, 1909 |
| 2,135,205 | Wilson | Nov. 1, 1938 |
| 2,387,625 | Walther et al. | Oct. 23, 1945 |
| 2,855,221 | Cochrane | Oct. 7, 1958 |
| 3,052,487 | Harbers et al. | Sept. 4, 1962 |